P. WINSOR & L. A. HALL.
Nut-Roaster.
No. 220,689. Patented Oct. 14, 1879.
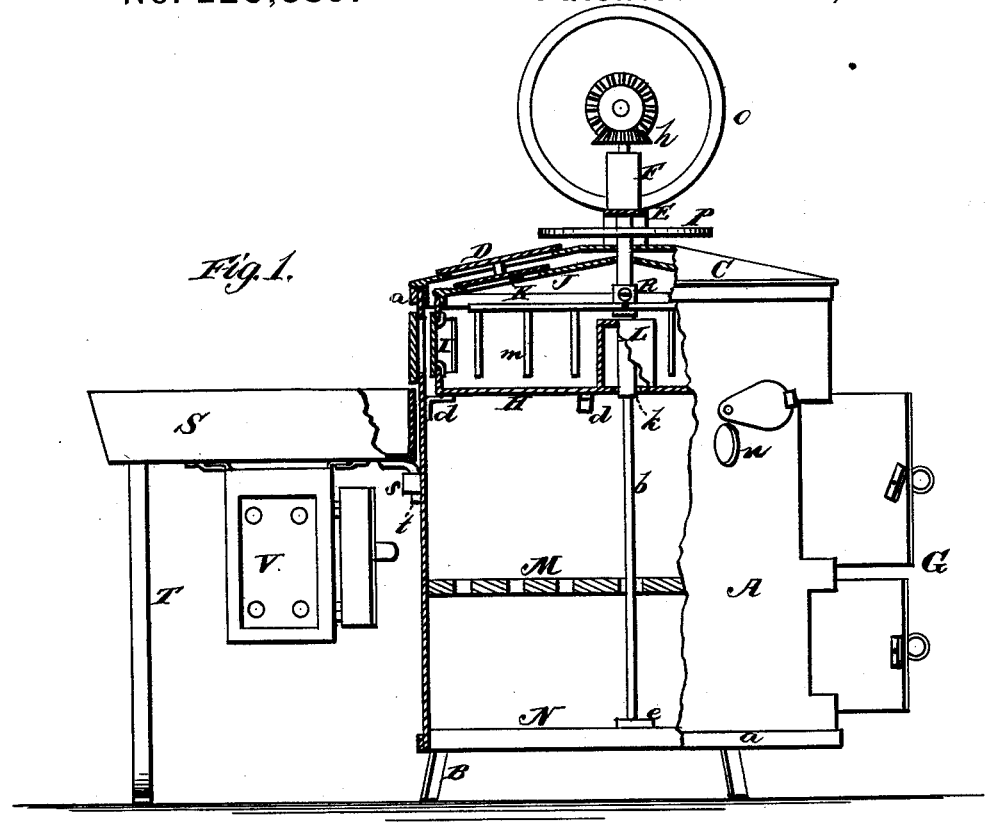
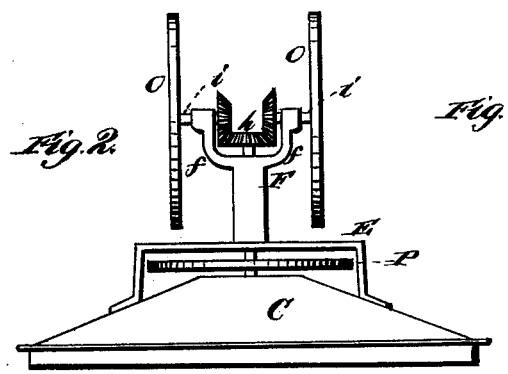
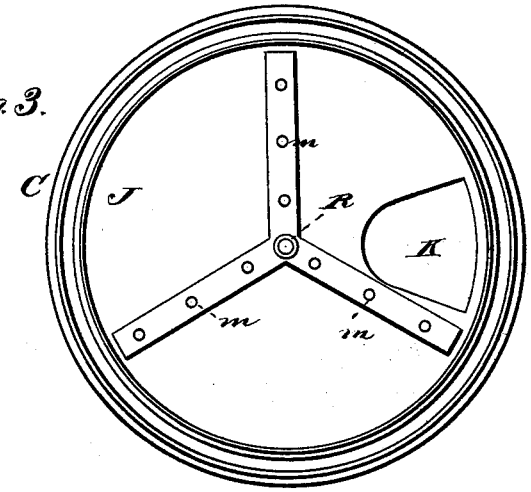
WITNESSES
Robert Everett
James J. Sheehy
INVENTOR.
Peter Winsor and
Lewis A. Hall
Gilmore, Smith & Co. ATTORNEYS

UNITED STATES PATENT OFFICE.

PETER WINSOR AND LEWIS A. HALL, OF OWATONNA, MINNESOTA.

IMPROVEMENT IN NUT-ROASTERS.

Specification forming part of Letters Patent No. 220,689, dated October 14, 1879; application filed July 26, 1879.

*To all whom it may concern:*

Be it known that we, PETER WINSOR and LEWIS A. HALL, of Owatonna, in the county of Steele and State of Minnesota, have invented certain new and useful Improvements in Nut-Roaster and Advertiser; and we do hereby declare that the following is a full, clear, and exact description of the construction and operation of the same, reference being had to the annexed drawings, making a part of this specification, and to the letters and figures of reference marked thereon.

Figure 1 of the drawings is a representation of a side elevation, partly in section, of our roaster and advertiser. Fig. 2 is a detail view of the same, and Fig. 3 is also a detail view.

The nature of our invention consists in the construction and arrangement of a machine for roasting nuts, as will be hereinafter more fully set forth.

The annexed drawings, to which reference is made, fully illustrates our invention.

A represents the outside shell, made of sheet-iron or other suitable material, in a cylindrical form, with an iron band, $a$, around the outside, at top and bottom, to strengthen the same, and it is supported upon three or more legs, B. At the top is a cover, C, with a flange fitting the inside of the shell. This cover has a door, D, cut through it, for the purpose of having access to the pan.

Attached to the cover is an iron brace, E, through which the shaft $b$ passes, and to which is fastened the stud or stand F, which supports the shafts of the advertising-wheels.

Doors G are cut through the shell at suitable places, to admit of access to the pan, the lamp-floor, and the floor where the clock-movement rests.

The pan H is made of sheet-iron or other suitable material, and is circular in shape, having sides of suitable height. Through the sides of the pan is an aperture having a sliding door, I, for the purpose of affording access to the inside of the pan.

J is the cover of the pan, having a flange fitting the inside of the rim thereof. Through the pan-cover J is an aperture having a swinging cover, K, to be closed while the nuts are roasting, and opened for putting in or taking out the nuts.

In the center of the pan is a cylindrical shield or guard, L, fastened to the bottom thereof, for the purpose of keeping the nuts away from the center of the pan, so that they may be properly stirred.

The upright shaft $b$ passes through holes in bottom of pan and top of shield.

The pan H is fastened to the inside of the shell by brackets $d$, bolted or riveted to both pan and shell, leaving a space between them, as shown, and the pan-cover J may be fastened by hooks or other suitable means.

At a proper distance below the pan is a floor, M, made of wood or other suitable material, perforated to admit a free passage of air to the lamps, and fastened to the inside of the shell, and on which are placed the lamps that are used for heating the pan. Beneath this floor is a floor, N, to which is fastened the step $e$, for the lower end of the shaft $b$, and also for the clock-movement that runs the shaft.

The stand or stud F has two arms, $ff$, the ends of which form bearings for the shaft $i$ of the advertising-wheels O. A miter-gear, $h$, is attached on the upright shaft $b$, and meshes with similar gear on the advertising-wheels, for rotating the same.

To stir the nuts while being roasted, a device is used consisting of a hand-wheel, P, having a piece of pipe, $k$, attached to it, and extending down, encircling the shaft $b$, into the inside of the pan. A casting, R, having three or more arms, to which are attached the stirrers $m$, slides over the pipe $k$, and is held in place by a set-screw. The stirring-wheel is run by hand-power.

The shaft $b$, that runs the display or advertising wheels, is to be run by a clock-movement, located as above described.

The heat for roasting the nuts is furnished by kerosene-lamps or oil-stoves placed on the floor M. Opposite the bottom of the pan, in the outside shell, are holes $n$, for admitting air to the lamps or for the escape of hot air.

A pan or tray, S, for holding the nuts while exposed for sale, is attached to the shell or outside of the roaster by having eyes $s$ fastened to the roaster, and hooks *t* fastened at the bottom of the tray at suitable points to fit said eyes. The other end of the tray is supported by iron legs T. Under the tray, and attached to it, is a receptacle, V, for a lamp, which is used to keep the nuts warm while being exposed for sale.

We claim—

1. In a nut-roaster, the combination of the shell A, having ports *n*, removable cover C, perforated floor M, and floor N with the stationary pan H, having cover J K, and the hand-stirrer R *m*, having wheel P, as and for the purposes set forth.

2. In a nut-roaster, the combination of the shaft *b*, standard F, miter-gear *h*, and display-wheels O O, adapted to be connected with suitable clock mechanism for running the same, as set forth.

In testimony that we claim the above we have hereunto subscribed our names in the presence of two witnesses.

PETER WINSOR.
LEWIS A. HALL.

Witnesses:
J. A. CANSDELL,
A. G. MEYER.